United States Patent [19]

Fewin, Jr. et al.

[11] Patent Number: 5,108,250

[45] Date of Patent: Apr. 28, 1992

[54] MATERIAL MOVER BED FLOOR DRIVE SYNCHRONIZATION SYSTEM AND METHOD

[75] Inventors: Fred A. Fewin, Jr., Lubbock; Billy R. Masten, Shallowater; Larry B. Masten, Abernathy, all of Tex.

[73] Assignee: Anderson & Bigham, Lubbock, Tex.

[21] Appl. No.: 577,992

[22] Filed: Sep. 5, 1990

[51] Int. Cl.⁵ .................................................. B60P 1/38
[52] U.S. Cl. .................................. 414/528; 414/439; 414/491; 414/498; 414/786; 198/301; 198/310; 56/DIG. 15; 364/925.2; 340/673
[58] Field of Search ............... 414/527, 528, 434, 435, 414/437, 439, 491, 498, 499, 786, 469; 198/301, 310; 340/507, 673, 674, 670; 56/DIG. 15; 364/925.2, 925.3

[56] References Cited

U.S. PATENT DOCUMENTS

| | | |
|---|---|---|
| 3,209,932 | 10/1965 | Schiltz . |
| 4,081,094 | 3/1978 | Pereira et al. ............ 414/439 |
| 4,243,353 | 1/1981 | Reed . |
| 4,372,725 | 2/1983 | Moore et al. ............ 414/528 X |
| 4,441,848 | 4/1984 | Bailey . |
| 4,768,636 | 9/1988 | Ito et al. . |

OTHER PUBLICATIONS

"A New Era of Application for the Wiegand Effect", John E. Opie and Jon W. Bossoli, SAE Technical Paper No. 880406 given at International Congress and Exposition, Feb. 29, Mar. 4, 1988.

*Primary Examiner*—Frank E. Werner
*Attorney, Agent, or Firm*—Merchant, Gould, Smith, Edell, Welter & Schmidt

[57] ABSTRACT

A system and method for controlling an automatic loading/unloading material mover. The mover includes a wheeled vehicle having a tiltable bed with a live floor and a non-driven wheel and is used to load and unload heavy objects, such as cotton modules. Pulse-generating magnetic sensors are used to measure the displacement of both the non-driven wheel, and hence the vehicle, and the live floor. The displacement of the live floor is controlled by the synchronization system and method which includes a digital processor to match the displacement of the vehicle so that heavy modules being loaded or unloaded are not torn apart.

34 Claims, 7 Drawing Sheets

MATERIAL MOVER BED FLOOR DRIVE SYNCHRONIZATION SYSTEM AND METHOD

BACKGROUND OF THE INVENTION

The present invention relates generally to the field of automatic loading and unloading material movers. More particularly, the present invention relates to a mover wherein material is loaded and unloaded on a vehicle by having the floor of a tiltable bed of the vehicle move in a direction opposite to the direction of movement of the vehicle. The present invention is specifically described with respect to loading and unloading agricultural products such as cotton modules, but the principles involved are also applicable to other heavy materials.

An automatic loading/unloading material mover typically consists of a wheeled vehicle having a tiltable bed with a moving floor. Sometimes, the floor of the bed is powered by one or more hydraulic motors. For loading, the vehicle is backed into position next to a cotton module, for instance, and the bed of the vehicle is tilted so that the back edge of the bed touches or is in close proximity to the ground near the cotton module. Then, the vehicle slowly travels in reverse so that the tilted bed is forced underneath the cotton module At the same time, the floor of the tilted bed moves in the direction opposite that of the vehicle. This causes the cotton module to progress up the bed towards the front of the vehicle. Once the module is loaded on the bed of the vehicle, the bed is tilted back to a horizontal position and the module can be moved to a different location. To unload a module, the operation is reversed. The bed is tilted from its horizontal position until the back of the bed again touches the ground or is in close proximity to the ground. The vehicle then moves forward and the floor of the bed moves backwards. This causes the module to progress down the tilted bed and onto the ground.

It can be seen from the preceding description that it is important that the floor of the bed maintain a fixed position relative to the ground so that the module being unloaded or loaded is not jolted or pulled apart.

The prior art has several types of systems that attempt to control the speed of the bed floor so that it equals the speed of the vehicle. The most common prior art system uses a gauge wheel which engages the ground when the tiltable bed is inclined in the loading/unloading position. The speed of this gauge wheel along the ground is used to monitor the speed of the vehicle. This information is then used to control the speed of the bed floor, sometimes called a conveyor. The accuracy of this control system, however, is limited by the accuracy of the gauge wheel and the accuracy of the gauge wheel is greatly affected by the terrain. For instance, on muddy or slippery ground, the gauge wheel slips and does not provide an accurate indication of the speed of the vehicle. Since slippery ground is quite common in agricultural settings, these systems are sometimes not accurate enough to prevent damage to the module being loaded or unloaded due to the differences in the vehicle speed and the bed floor speed. A typical prior art system of this type is shown in U.S. Pat. No. 4,243,353 (Reed).

Another type of prior art synchronization system includes a roller which engages a non-driven wheel of the vehicle and rotates at a speed proportional to the vehicle velocity. This roller provides a signal which is used to synchronize the velocity of the bed floor. Again, however, the accuracy of this system is limited by the need for the roller to be maintained in very firm, non-slipping contact with the non-driven vehicle wheel. In agricultural conditions, this is often times not possible and hence the accuracy of the synchronization system suffers. This type of prior art system is shown in U.S. Pat. No. 4,081,094 and Reissue U.S. Pat. No. 30,404 (Pereira).

Another type of synchronization system is shown in U.S. Pat. No. 4,441,848 (Bailey). This system uses magnetic sensing on a non-driven wheel of the vehicle to determine the velocity of the vehicle. A magnetic sensor generates an alternating output voltage which is used to determine the velocity of the vehicle. A similar magnetic sensing system is used to determine the velocity of a conveyor belt on the bed of the vehicle. The vehicle speed and the conveyor belt speed are then compared in an analog fashion and the speed of the conveyor belt is adjusted accordingly. This system, while probably more accurate than those systems using a gauge wheel, still suffers from errors at the low speeds that are necessary during the load/unload process. At these very low vehicle speeds, it is quite difficult to accurately measure the velocity of the vehicle by processing the alternating output voltage received from the magnetic sensor. Likewise, any other method of measuring velocity, such as radar or sonar at these low speeds of the truck also provide inaccurate results. Furthermore, any errors produced in the speed measurement of either the vehicle or the bed floor are accumulated during the entire process.

The present invention provides an extremely accurate system for synchronizing the movement of the bed floor to the movement of the vehicle.

SUMMARY OF THE INVENTION

The present invention relates to an automatic loading/unloading material mover which includes a motorized vehicle having at least one non-driven wheel in a non-rotating wheel housing. The vehicle also has a bed which has a conveyor floor. The invention includes control means to tilt the bed to a position where the conveyor floor is at an angle between 0 and 90 degrees with respect to the ground. Motive power means are connected to the conveyor floor for displacing the conveyor floor relative to the vehicle in a direction parallel to the length of the vehicle. Further provided is displacement synchronization means connected to the motor power means for synchronizing the displacement of the conveyor floor relative to the vehicle, and the displacement of the vehicle. The displacement synchronization means includes first sensor means connected to the non-driven wheel and second sensor means connected to the conveyor floor. Each of the first and second sensor means provides a pulse for each unit of distance displaced by the vehicle and the conveyor floor, respectively. The displacement synchronization means also includes digital processing means for receiving the pulses from the first and second sensor means and generating an output signal proportional to the number of pulses received from each of the sensor means. Finally, the displacement synchronization means includes control mean for receiving the output signal from the digital processing means and controlling the motive power means so that the displacement of the conveyor floor is proportional to the output signal.

The present invention also relates to a method for automatically loading/unloading material onto or from a mover for moving material over a grade. In connection with a mover of the type having a motorized vehicle supported by at least one non-driven wheel and having a tiltable bed with a motorized conveyor floor, the method includes tilting the bed of the vehicle until the rear end of the bed is in close proximity to the grade, displacing the conveyor floor relative to the vehicle in a direction parallel to the direction of the vehicle, providing to a microprocessor an electric pulse corresponding to each unit of distance displaced by the vehicle, providing to the microprocessor an electric pulse corresponding to each unit of distance displaced by the conveyor floor relative to the vehicle, generating an output signal from the microprocessor that is proportional to the number of pulses that correspond to distance displaced by the vehicle and the number of pulses that correspond to distance displaced by the conveyor floor; and controlling the displacement of the conveyor floor so that the displacement is proportional to the output signal.

BRIEF DESCRIPTION OF THE DRAWINGS

In the drawings, in which like reference numerals and letters indicate corresponding parts throughout the several views.

DETAILED DESCRIPTION OF A PREFERRED EMBODIMENT

Figure 1:
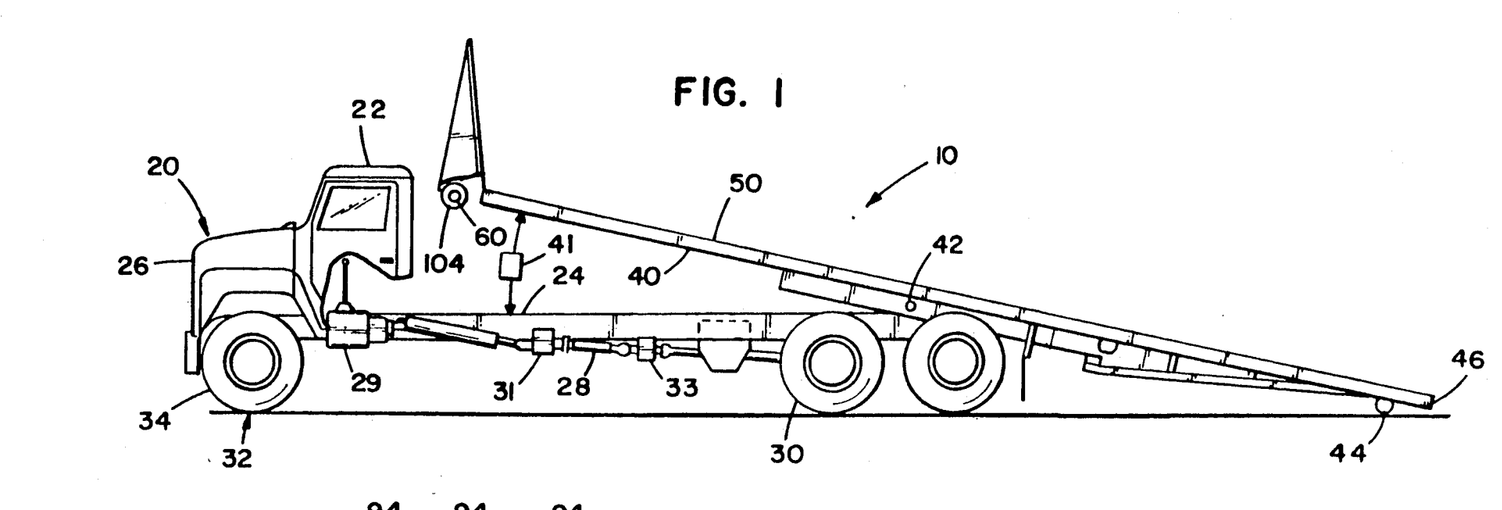
FIG. 1 is a left side elevation view of mover 10 of the present invention.

Illustrated in FIG. 1 is an automatic loading/unloading material mover, generally designated by the reference numeral 10, of the type to which the present invention relates. Mover 10 comprises a vehicle generally designated as 20 which includes cab 22 mounted on chassis 24. Chassis 24 is connected to and supported by a plurality of wheels which engage the ground as shown in FIG. 1. Vehicle 20 includes an engine (not shown) housed in the front portion 26 of vehicle 20 and connected to power train 28 which is in turn connected to the driven wheels 30. Power train 28 includes primary transmission 29, secondary transmission 31 and auxiliary transmission 33. Secondary transmission 31 and auxiliary transmission 33 provide the additional gear reduction required for the loading/unloading process. The front wheels of vehicle 20 are non-driven wheels and non-driven wheel assembly 32 is shown in FIG. 1. Non-driven wheel assembly 32 includes tire 34.

Vehicle 20 further includes bed 40. As shown in FIG. 1, tilt control means 41 tilts bed 40 up and down with respect to chassis 24 of vehicle 20 about pivot point 42. Bed 40 includes small wheel 44 to support bed 40 when bed 40 is tilted so that the rear end 46 of bed 40 is in close proximity to the ground. Bed 40 has a floor capable of moving in a direction parallel to the length of vehicle 20. Such a moving floor is often times referred to as a live floor and can be any of a number of types such as conveyor belts or chains. In the preferred embodiment of the present invention, the live floor is chain floor 50 driven by drive shaft 60 which is in turn powered by two hydraulic motors as shown in more detail in FIGS. 2A and 2B.

The two hydraulic motors driving chain floor 50 are powered by a hydraulic positive displacement, variable flow pump (not shown in FIG. 1, but located within chassis 24 behind cab 22) in a manner well known in the art. The variable flow hydraulic pump controls the speed of the hydraulic motors and hence chain floor 50 and is in turn connected to and driven by the power take off (pto) of power train 28.

Figure 2A:
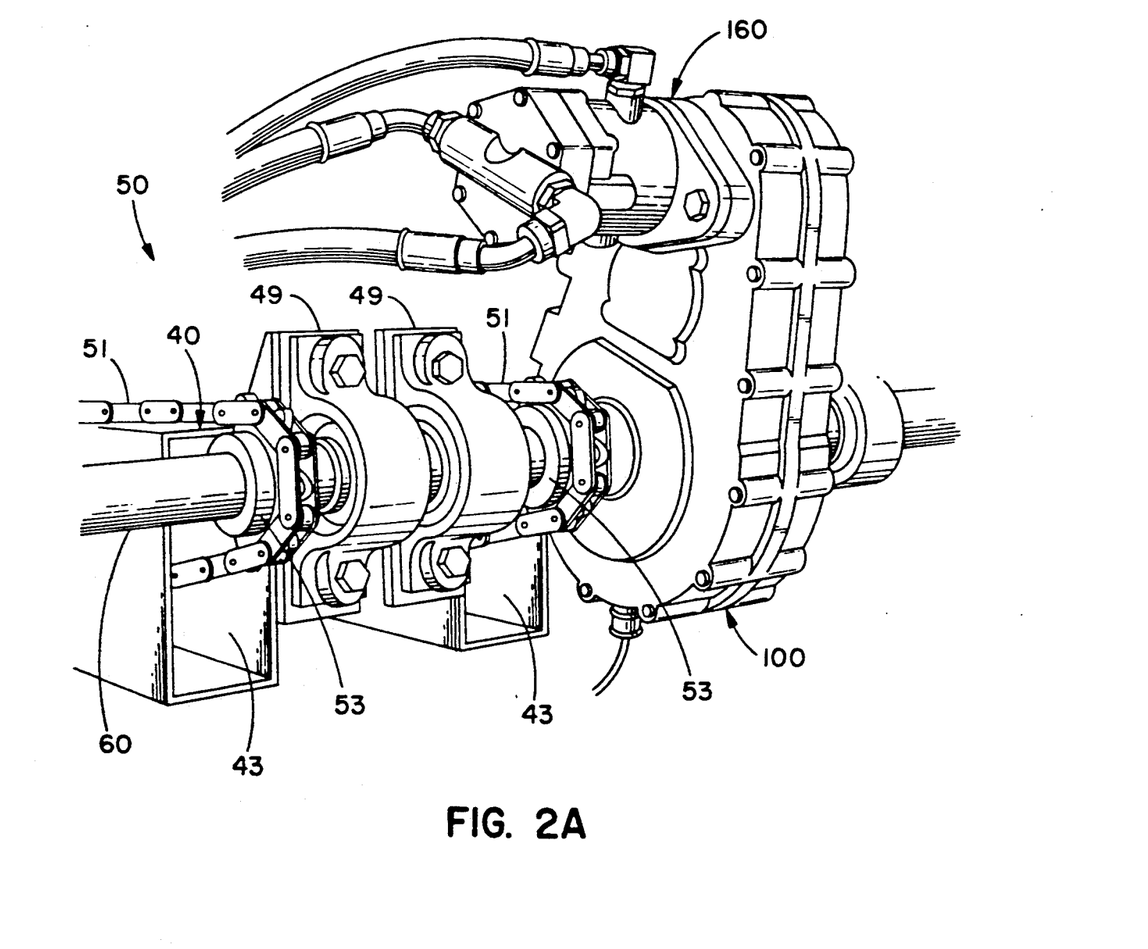
FIG. 2A is a partial perspective view of chain floor 50 and drive shaft 60 of the present invention.
Figure 2B:
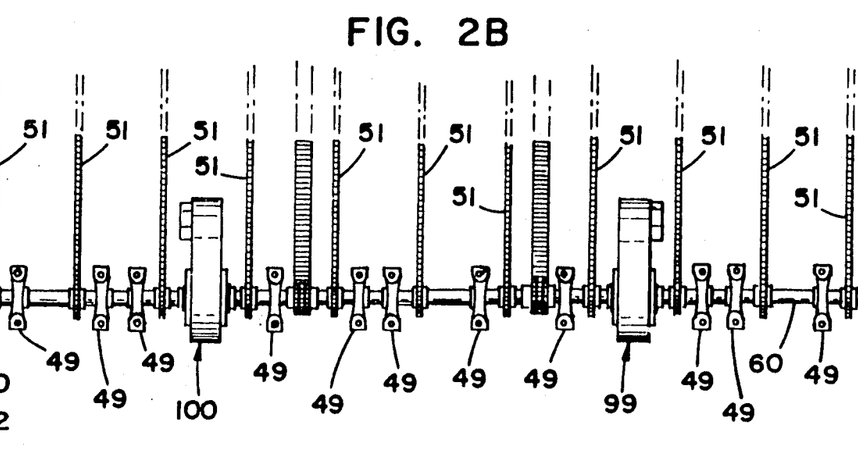
FIG. 2B is a plan view of chain floor 50 and drive shaft 60 of the present invention.

FIGS. 2A and 2B show chain floor 50 and its connection to drive shaft 60. In the preferred embodiment, chain floor 50 is made up of eleven chains 51 moving over the top of bed 40, each of which engage drive shaft 60 by means of sprockets 53. As seen in FIG. 2A, chains 51 travel freely in a circular path over the top of bed 40 and under bed 40 through conduits 43. Drive shaft 60 is mounted on bed 40 by bearings 49. Also shown in FIGS. 2A and 2B are two chain drive gear boxes 100 and 99, which receive the drive shaft of hydraulic motors, 160 and 161, respectively. Hydraulic motors 160 and 161 are driven by the hydraulic pump mentioned above. Boxes 100 and 99 provide gear reduction between the drive shafts of motors 160 and 161 and drive shaft 60 and are identical in operation. Box 100, however, contains additional parts used in the synchronization process and explained more fully below.

Figure 3:
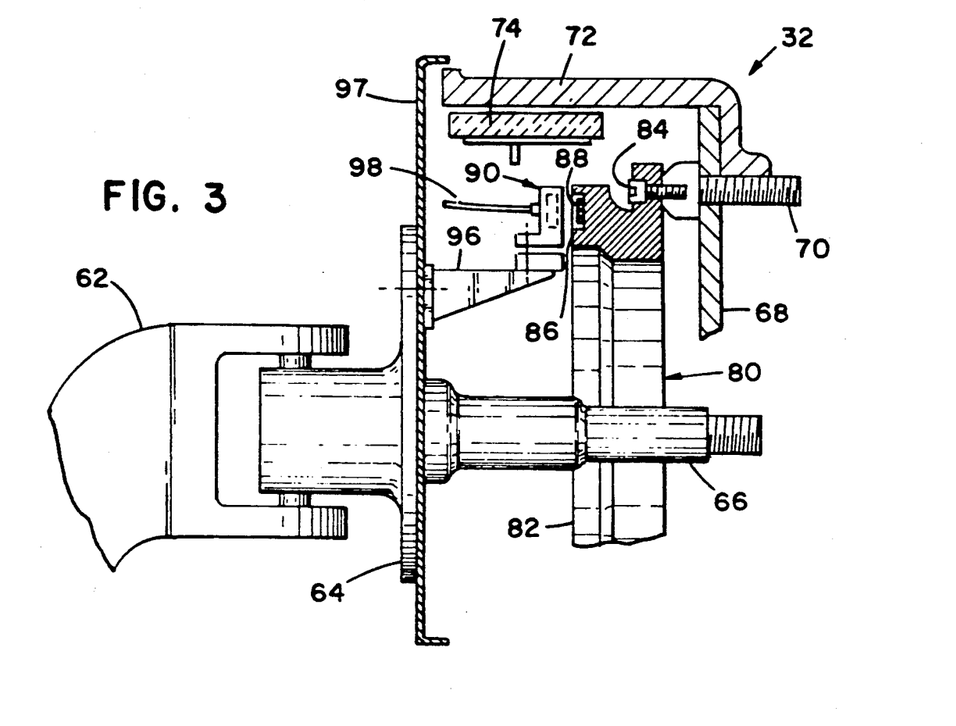
FIG. 3 is a side elevation view taken partially in cross section of non-driven wheel assembly 32 of the present invention.

Turning now to FIG. 3, a portion of non-driven wheel assembly 32 is shown in greater detail. Front axle 62 of vehicle 20 turns when vehicle 20 is driven. Front axle 62 is connected to union 64 which is in turn rigidly connected to spindle 66. Non-drive wheel 68 is rigidly fastened to spindle 66 and includes a plurality of wheel studs 70. Brake drum 72 is positioned around wheel 68 and brake shoe 74 is positioned inside of brake drum 72. Also connected to wheel 68 is wheel magnet seat assembly 80 which includes concentric ring 82 which is fastened to each of wheel studs 70 by bolts 84. Ring 82 has a concentric groove 86 in which magnets 88 are attached. The placement of magnets 88 will be explained in more detail with reference to FIG. 4.

Still referring to FIG. 3, wheel sensor assembly 90 is mounted on pedestal 96 which is in turn mounted on backing plate 97. Wheel sensor assembly 90 is electrically connected to the floor displacement microprocessor through a signal shaping circuit (not shown in FIG. 3) by cable 98. It can be seen from FIG. 3 that when wheel 68 rotates, wheel magnet seat assembly 80 rotates as well. Wheel sensor assembly 90, connected to stationary backing plate 97 by pedestal 96, does not rotate.

Figure 4:
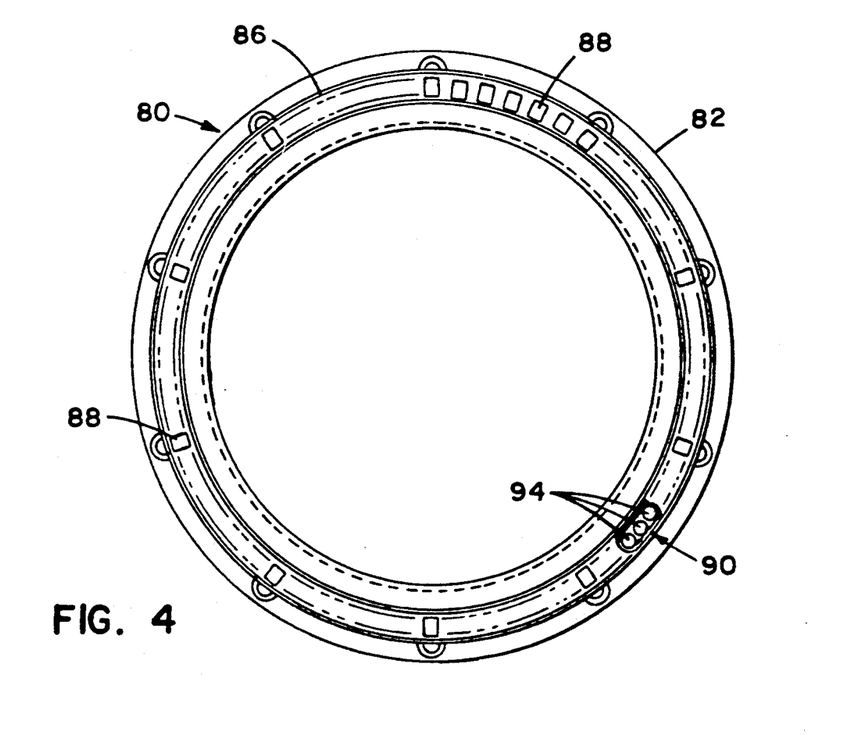
FIG. 4 is a front elevation view of wheel magnet seat 80 of the present invention.

Turning now to FIG. 4, the top plan view of wheel magnet seat 80 is shown. Ring 82 has a concentric groove 86 in which is placed ceramic magnets 88. In the preferred embodiment of the present invention, as can be seen in FIG. 4, sixty magnets 88 are equally spaced at six degree intervals in groove 86 and are securely fastened to ring 82 by glue or the equivalent. The positioning of wheel sensor assembly 90 with respect to wheel magnet seat assembly 80 is also shown in FIG. 4.

Figure 5:
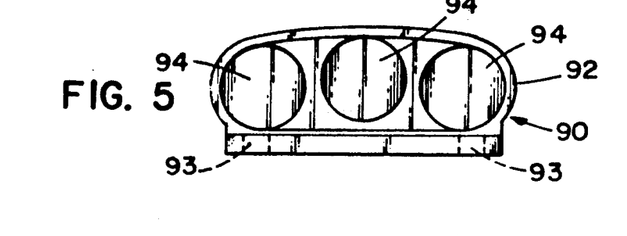
FIG. 5 is a top plan view of wheel sensor assembly 90 of the present invention.
Figure 6:
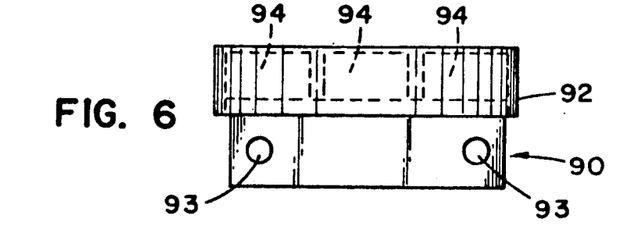
FIG. 6 is a side elevation view of wheel sensor assembly 90 of the present invention.

Wheel sensor assembly 90 is shown in more detail in FIGS. 5 and 6. In the preferred embodiment, sensor assembly 90 includes housing 92 in which is mounted three identical pulse-generating magnetic sensors 94, mounted on housing 92 at 8° intervals at about 1 inch centers. Housing 92 contains screw holes 93 for attaching wheel sensor assembly 90 to pedestal 96.

In the preferred embodiment of the present invention, each of sensors 94 is a Wiegand-effect sensor. Because sensors 94 are identical, a description of one sensor 94 will suffice as a description of the other two sensors 94. Sensor 94 contains a small diameter wire drawn from a magnetic alloy such as Vicalloy which is then processed by cold working so as to cause a gradient or magnetic hardness from the center of the wire to the exterior of the wire. When the wire is exposed to magnetic fields of proper orientation, intensities, and sequence, substantial flux jumps occur within the wire. By use of an inductive pick-up coil, these flux jumps can be converted to an electrical pulse. The wire has a bistable magnetic threshold which is quite insensitive to speed and immune to most ambient magnetic field disturbances. The Wiegand effect is more thoroughly explained in Technical Paper No. 880406 entitled "A New Era of Application for the Wiegand Effect" published by the Society of Automotive Engineers, Inc. and written by John E. Opie and Jon W. Bossoli, herein incorporated by reference.

In the present invention, sensors 94 provide excellent immunity to unwanted signal interference not only from noise such as electro-magnetic interference, but also from unwanted signals during any time that non-driven wheel assembly 32 is stationary, but rocking slightly. Each of sensors 94 generates a pulse when the rotation of wheel 68 causes magnets 88 on ring 82 to move enough to change the magnetic pole. The movement of wheel 68 is thus only sensed when wheel 68 moves far enough to change the magnetic pole and overcome the hysteresis of the sensor 94. The hysteresis of sensor 94 provides important advantages. If optical or Hall-effect sensors were used to measure displacement, there would be spurious signals generated when, for instance, the vehicle was stopped, but rocked slightly. These spurious signals would cause the chain floor to move in an undesirable jerky manner. With the hysteresis of sensor 94, these undesirable results are avoided.

In the preferred embodiment, sensors 94 are wired in series. Therefore, when a pulse is delivered by any one of sensors 94, it is passed through the others to displacement processor 144, shown in FIG. 12, through a signal shaping circuit by cable 98.

In the preferred embodiment of the present invention, the size of wheel 68 and wheel magnet seat assembly 80 allow for sixty magnets 88 to be placed in groove 86 without any interference between magnets 88. Using three sensors 94 provides three times as many pulses when wheel 68 rotates and allows even small displacements of wheel 68, and hence vehicle 20, to be monitored very accurately. In the preferred embodiment, the diameter of the circle made by magnets 88 is 10.25 inches and as noted above, the three sensors 94 are placed at 8° intervals at about 1 inch centers. This configuration of magnets 88 and sensors 94 cause sensor assembly 90 to generate a pulse to displacement microprocessor 144 every time wheel 68 moves about one inch. This configuration provides about a 1 inch hysteresis.

Figure 7:
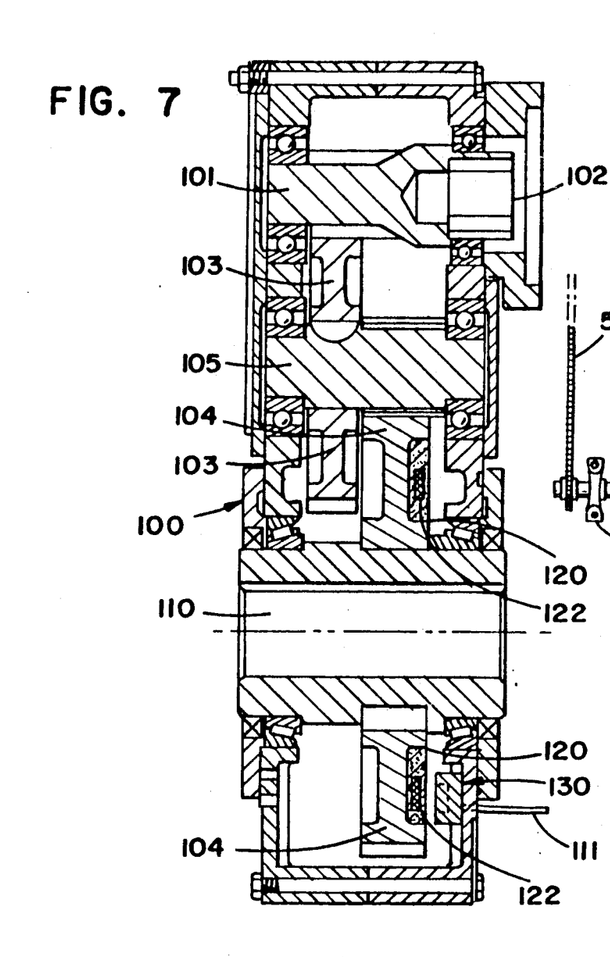
FIG. 7 is a side cross sectional view of gear box 100 of the present invention.

FIG. 7 is a cross-sectional view of chain drive gear box 100 to which chain floor drive shaft 60 is connected. Bore 102 of input shaft 101 receives the shaft of the hydraulic motor (not shown in FIG. 7). Input shaft 101 engages gear 103 which is connected to gear 105. Gear 105 engages gear 104 which receives chain floor drive shaft 60 in bore 110. Chain drive gear box 100 is a double reduction speed reducer gear box.

Figure 8:
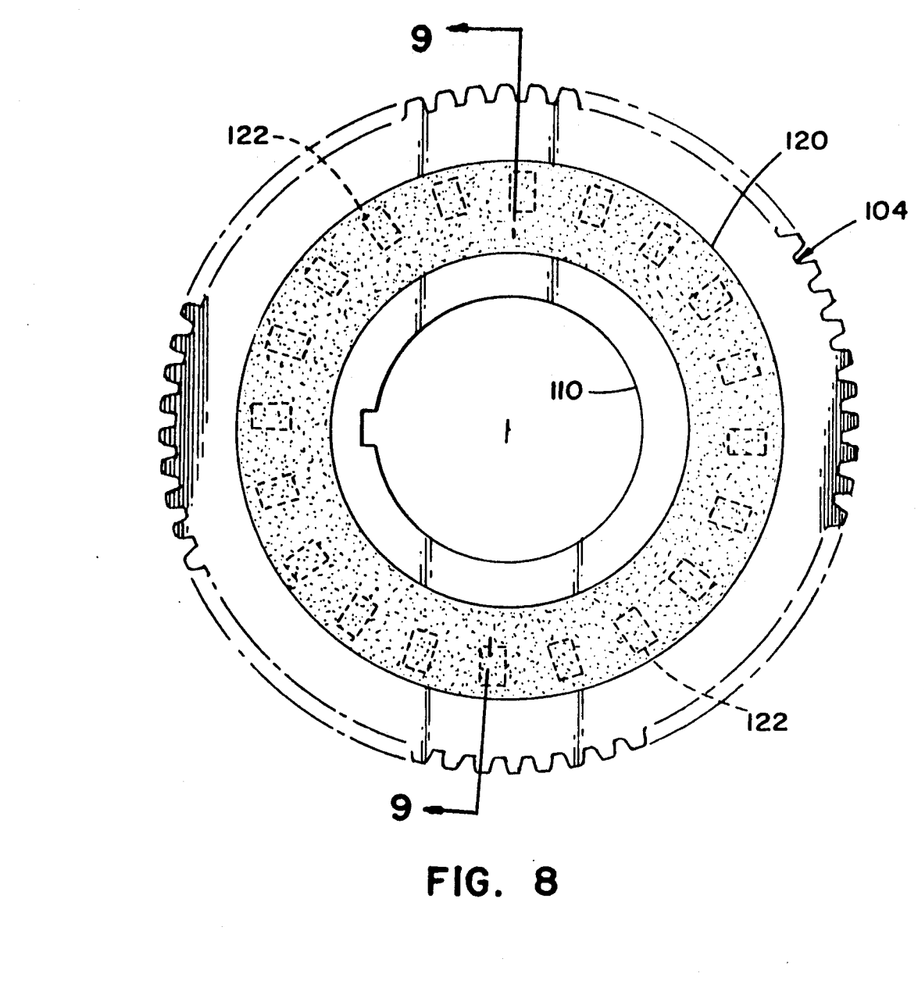
FIG. 8 is a front elevation view of gear 104 of the present invention.
Figure 9:
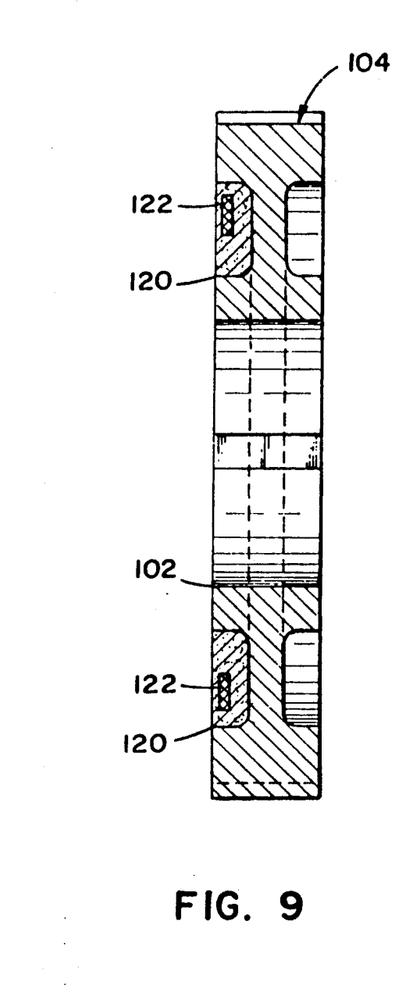
FIG. 9 is a cross sectional view taken on line 9—9 in FIG. 8.

Gear 104 is shown in more detail in FIG. 8. In the preferred embodiment, gear 104 has 68 teeth. Mounted in channel 120 on gear 104 are twenty ceramic magnets 122 equally spaced at 18 degree intervals. After magnets 122 are placed in channel 120, epoxy is poured into channel into channel 120 and covers magnets 122. A detailed cross-sectional view of gear 104 is shown in FIG. 9.

Figure 10:
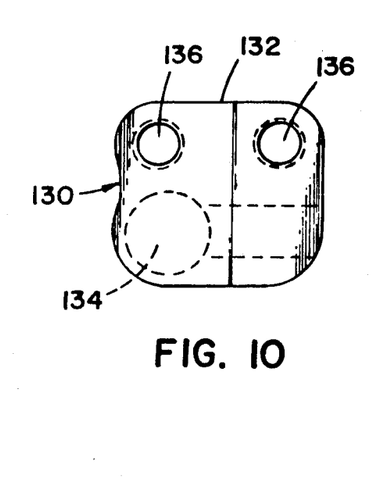
FIG. 10 is a front elevation view of chain drive sensor assembly 130 of the present invention.
Figure 11:
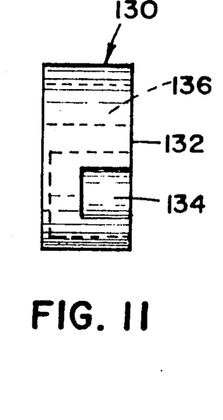
FIG. 11 is a side elevation view of chain drive sensor assembly 130 of the present invention.

As shown in FIG. 7, chain drive sensor assembly 130 is attached to the inner wall portion of chain drive gear box 100. Chain drive sensor assembly 130 is electrically connected to the floor displacement microprocessor 144, shown in FIG. 12, through a signal shaping circuit by cable 111 and is mounted so that it is in close proximity to the path made by magnets 122 when gear 104 rotates. FIGS. 10 and 11 show chain drive sensor assembly 130 in more detail. Sensor assembly 130 includes housing 132 and sensor 134. Sensor assembly 130 is attached to chain drive gear box 100 by means of screws through tapped holes 136. Sensor 134 is a pulse-generating magnetic sensor of the same type as sensors 94 described above.

In the preferred embodiment of the present invention, due to the size of tire 34 on non-driven wheel assembly 32, vehicle 20 is displaced 126.47 inches per revolution of non-driven wheel 68. Furthermore, because wheel magnet seat assembly 80 has 60 magnets and because each of sensors 94 generate a pulse for each magnet, wheel sensor assembly 30 generates 180 pulses per revolution of wheel 68. Because of the size of chain floor drive shaft 60 and the connection of chain floor 50, chain floor 50 is displaced 14.40 inches per revolution of drive shaft 60. Therefore, to displace chain floor 50 126.47 inches, drive shaft 60 must make 8.78 revolutions. Ideally, chain drive sensor assembly 130 would generate the same number of pulses per distance traveled by chain floor 50 as the number of pulses generated by wheel sensor assembly 90 when vehicle 20 travels that same distance. In practice, magnets are placed on gear 104 so as to come as close as possible to this ideal. As stated above, wheel sensor assembly 90 generates 180 pulses per revolution of wheel 68 (per 126.47 inches of vehicle travel). For the same distance travelled by chain floor 50 (126.47 inches) drive shaft 60 rotates 8.78 times. If twenty magnets 122 are equally spaced on gear 104, chain drive sensor assembly 130 generates approximately 175 pulses (20 times 8.78) for every 126.47 inches travelled by chain floor 50. The difference between 180 pulses from wheel sensor assembly 90 and 175 pulses from chain drive sensor assembly 130 is compensated for by displacement microprocessor 144 as explained below.

It is understood that different configurations of magnets and sensors could be used for both wheel magnet seat assembly 80 and wheel sensor assembly 90, and gear 104 and chain drive sensor assembly 130, as long as it is known how many pulses the respective sensor assemblies will provide per unit of distance of travel of vehicle 20 and chain floor 50.

Figure 12:
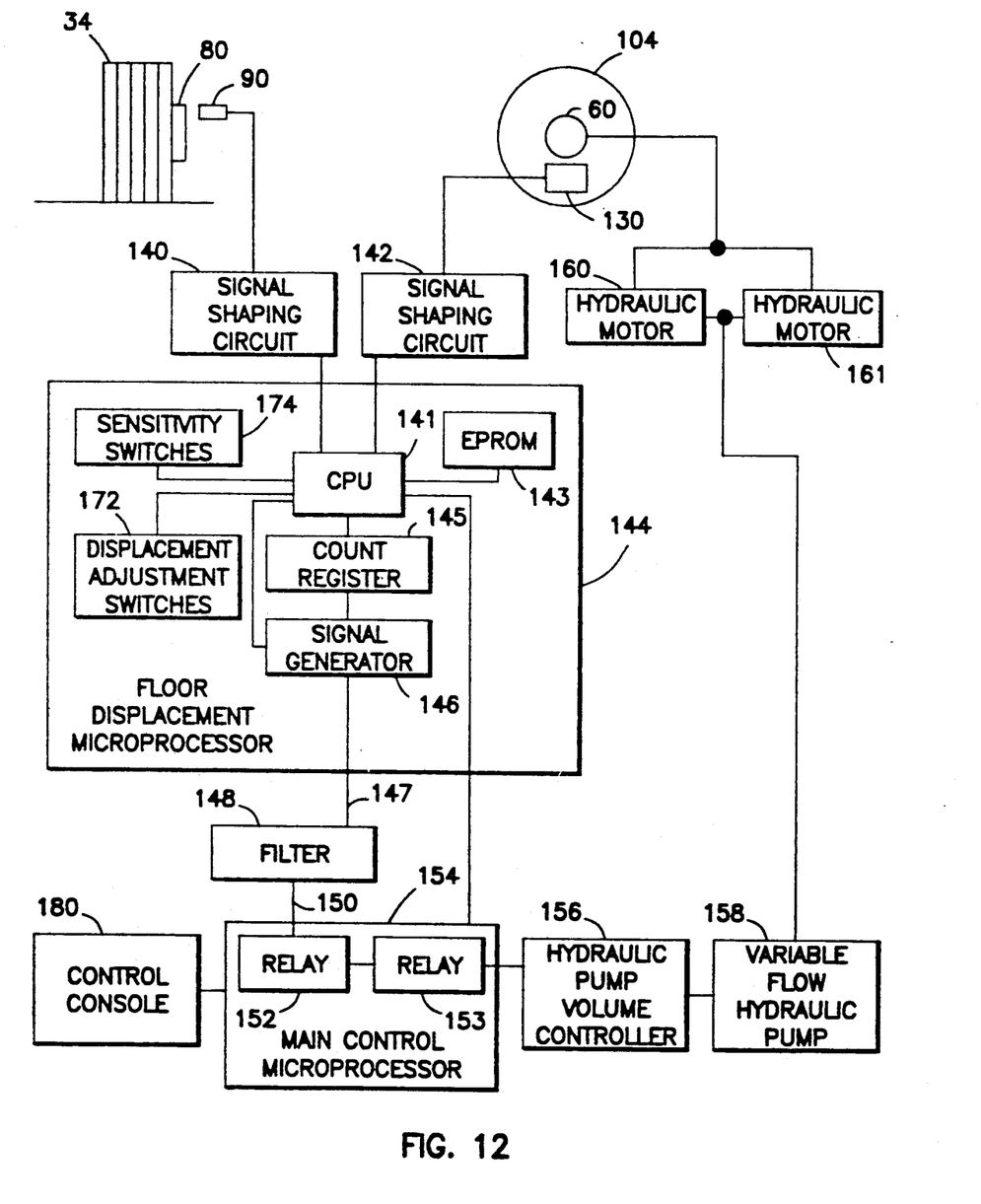
FIG. 12 is a block diagram of the synchronization control system of the present invention.

A block diagram of the synchronization control system of the present invention is shown in FIG. 12. Pulses generated by sensor assemblies 90 and 130 are detected and shaped by signal shaping circuits 140 and 142, respectively, and passed through to floor displacement microprocessor 144. Pulse shaping circuits 140 and 142 amplify and lengthen the pulses from sensor assemblies 90 and 130, respectively.

In the preferred embodiment of the present invention, displacement microprocessor 144 is a stand-alone, eight-bit Motorola processor M68HC705C86P including an EPROM so that the microprocessor can operate in single-chip mode. It is understood that displacement microprocessor 144 can be one of any number of microprocessor containing a CPU, programmable memory space, registers and DIP switches, or the equivalent.

When displacement microprocessor 144 receives a pulse from wheel sensor assembly 90, CPU 141 of microprocessor 144 is directed by the program in EPROM 143 to increment COUNT register 145. When displacement microprocessor 144 receives a pulse from chain drive sensor assembly 130, the program in EPROM 143 directs CPU 141 to decrement COUNT register 145. Signal generator 146 within microprocessor 144 generates a pulse width modulated output signal 147 which has a duty cycle which is proportional to the value in COUNT register 145. Microprocessor 144 also contains sensitivity DIP switches 174 and displacement adjustment DIP switches 172, the function of which will be discussed below.

Output signal 147 is sent to filter 148. Filter 148 includes an RC circuit and an operational amplifier and modifies output signal 147 by smoothing and averaging signal 147 to remove sharp edges in a manner well-known in the art. Output voltage 150 is proportional to the duty cycle of output signal 147 and thus proportional to the value in COUNT register 145.

The value of COUNT register 145 is thus the error between the number of pulses received from wheel sensor assembly 90 and the number of pulses received from chain drive sensor assembly 130. As explained above, wheel sensor assembly 90, and its wheel magnet seat assembly 80, and corresponding chain drive sensor assembly 130, and its gear 104, are configured so that each of sensor assemblies 90 and 130 provides roughly the same number of pulses per the same distance travelled by vehicle 20 and chain floor 50, respectively. It can be seen that the larger the error between the number of pulses received from wheel sensor assembly 90 and the number of pulses received from chain drive sensor assembly 130, the further that chain floor 50 is "lagging behind" vehicle 20 and the higher that output voltage 150 will be.

Output voltage 150 is sent through relay sets 152 and 153, explained below, in main control microprocessor 154, to the input of hydraulic pump volume controller 156. Hydraulic pump volume controller 156 controls the volume of positive displacement, variable flow, hydraulic pump 158 so that the volume of pump 158 is proportional to output voltage 150. In practice, hydraulic pump volume controller 156 is an integral part of hydraulic pump 158, but is shown separately in FIG. 12 for ease of description. A hydraulic pump with a variable volume valve could be used in place of the pump in the preferred embodiment, but is not preferred. When the RPMs of motorized vehicle 20 change quickly, when the gas pedal is stepped on, the variable displacement pump reacts immediately to change its RPMs and the volume of flow to the hydraulic motors. A pump having a variable volume valve changes its RPMs, but the valve is slower to adjust and would create more lag time between the displacement of the conveyor floor and the vehicle.

Hydraulic pump 158 drives hydraulic motors 160 and 161 which in turn drive chain floor 50 through chain drive gear boxes 100 and 99 and drive shaft 60 as shown in FIGS. 2A and 2B. As is well known in the art, the higher the volume of hydraulic pump 158, the greater the output of hydraulic motors 160 and 161 and the faster chain floor 50 is made to move. As can be seen from the preceding description, the higher the error between the distance that vehicle 20 has moved (as measured by the distance that non-driven wheel 68 has moved), and the distance that chain floor 50 has moved, the faster that chain floor 50 will be made to move by synchronization control system as illustrated in FIG. 12.

In operation, as vehicle 20 begins to move, COUNT register 145 in floor displacement microprocessor 144 will increase as CPU 141 increments COUNT register 145 when pulses are received from wheel sensor assembly 90. The increase in the value of COUNT register 145 causes there to be an output signal 147 which in turn increases the volume of hydraulic pump 158 through the action of hydraulic pump volume controller 156. This causes hydraulic motors 160 and 161 to rotate drive shaft 60 and hence chain floor 50 begins to move.

As chain floor 50 begins to move, the value in the COUNT register 145 in floor displacement microprocessor 144 starts to decrease as CPU 141 decrements the COUNT register when pulses are generated by chain drive sensor assembly 130 (because chain floor 150 is moving) and received by microprocessor 144. If vehicle 20 moves at a constant speed, chain floor 50 will match the speed. When vehicle 20 stops, COUNT register 145 will decrease because displacement microprocessor 144 at that time is only receiving pulses from chain drive sensor assembly 130 which cause CPU 141 to decrement COUNT register 145. The decrease in COUNT register 145 causes chain floor 50 to slow down until it stops because output signal 150 slowly decreases to the point where hydraulic pump 158 stops powering hydraulic motors 160 and 161.

When vehicle 20 is being operated in the manual mode, as explained below, relay set 152 is activated by main control microprocessor 154, and allows center tap potentiometer 234, shown in FIG. 13, to control hydraulic pump volume controller 156 and hence the displacement of chain floor 50. When vehicle 20 is in reverse, relay set 153 is activated by main control microprocessor 154 to reverse the direction of flow of hydraulic pump 158. This reversal in the flow direction causes hydraulic motors 160 and 161 to rotate in the opposite direction and hence chain floor 50 moves in the opposite direction. This control feature provides an automatic selection of loading or unloading modules onto or from mover 10.

Digitally measuring the displacement of both the non-driven wheel 68 and chain floor 50 provides a very accurate means of control. The present invention does not attempt to measure the velocity of either vehicle 20 or chain floor 50, but rather measures the displacement of vehicle 20 and chain floor 50 and uses the error between the displacement to synchronize the movement of chain floor 50 with vehicle 20 so that modules being loaded on or unloaded off mover 10 are moved in a smooth fashion without being torn apart. It is especially noteworthy that these accurate results are obtained at even the very low speeds of vehicle 20 necessary during the loading or unloading process.

Two additional features are provided in the preferred embodiment of the synchronization control system of the present invention. As seen in FIG. 12, chain adjustment DIP switches 172 are provided and are manually set by the operator of mover 10. Floor displacement microprocessor 144 reads adjustment switches 172 when microprocessor 144 is initialized. If the most significant position of this eight bit binary word is set, equal to one, microprocessor 144 adds a pulse to the number of pulses received from wheel sensor assembly 90, thus causing CPU 141 to increment COUNT register 145 an additional time. This has the effect of requiring an additional pulse from chain drive sensor assembly 130, or, in other words, it speeds up chain floor 50 and increases the ratio of the distance that the chain floor 50 is displaced with respect to the distance that vehicle 20 is displaced. Microprocessor 144 reads the remaining seven bits in the eight bit binary word to determine how frequently to add a pulse to the pulses received from wheel sensor assembly 90. Because seven bits are available to determine the frequency, a pulse can be added as infrequently as one pulse per 127 pulses received from wheel sensor assembly 90 up to as frequently as one pulse per one pulse received from wheel sensor assembly 90. Thus, chain floor 50 could be driven so that chain drive sensor assembly 130 provides twice as many pulses as wheel sensor assembly 90, and hence chain floor 50 could be driven to move twice the distance that vehicle 20 moves.

If the most significant bit of the eight bit binary word from adjustment switches 172 read by displacement microprocessor 144 is not set, equal to zero, then displacement microprocessor 144 adds a pulse to those pulses received from chain drive sensor assembly 130. This has the effect of requiring one less pulse from chain drive sensor assembly 130, thus decreasing the ratio of the distance displaced by chain floor 50 to the distance displaced by vehicle 20. Again, microprocessor 144 reads the remaining seven bits in the eight bit binary word to determine how frequently to add a chain pulse. As before, a pulse can be added as infrequently as one per 127 pulses received from chain drive sensor assembly 130 and as frequently as one per one pulse received from chain drive sensor assembly 130. Therefore, chain drive sensor assembly can be forced to supply half as many pulses as wheel sensor assembly 90 and hence chain floor 50 can be driven to be displaced half the distance that vehicle is displaced.

The additional control capability afforded by this chain displacement adjustment feature allows different chain drive gear ratios to be used on different vehicles without affecting the control capability. It also allows for compacting or loosening of modules during the loading or unloading process. In the preferred embodiment of the present invention, this chain displacement adjustment feature adjusts for the fact that chain drive sensor assembly 130 is only providing 175 pulses for every 180 pulses generated by wheel sensor assembly 90 when vehicle 20 has been displaced and the same distance as chain floor 50.

The other additional feature provided in the preferred embodiment of the present invention is a sensitivity feature. Again, referring to FIG. 12, floor displacement microprocessor 144 includes eight sensitivity DIP switches 174. When displacement microprocessor 144 is initialized, it reads the eight sensitivity switches 174 to determine the number of error "COUNT" pulses at which to maximize the speed of chain floor 50. For example, if the eight bit binary word read from sensitivity switches 174 is 00000111 (equal to a decimal 7) chain floor 50 will be made to move at maximum speed when the value of COUNT register 145 (the error between the number of pulses received from wheel sensor assembly 90 and the number of pulses received from chain drive sensor assembly 130) equals 7. In this manner, the maximum amount of error would be seven counts or in the preferred embodiment, about seven inches. In a like manner, if the eight bit binary word read from sensitivity switches 174 is 00001111 (decimal 15) this would provide that chain floor 50 is driven at maximum speed when COUNT register 145 is equal to 15 so that the maximum error between chain floor displacement to vehicle displacement is 15 counts or about 15 inches in the preferred embodiment. Position lag between chain floor 50 and vehicle 20 is thus proportional to vehicle displacement and no greater than the sensitivity value contained in the eight bit binary word read from sensitivity switches 174.

The sensitivity switches 174 can be set by the operator of mover 10 so that the error between chain floor displacement and vehicle displacement is insignificant and the chain floor motion is smooth. There is a tradeoff in setting the sensitivity. If the system is too sensitive, the displacement of chain floor 50 will be too jerky. If the system is not sensitive enough, the displacement of chain floor 50 will lag too far behind the displacement of vehicle 20. Errors of less then four inches cumulative over the entire load or unload process are obtainable with the preferred embodiment of the synchronization control system of the present invention.

The operator of mover 10 can monitor and set the other control features of mover 10 at control console 180. Control console 180 is electrically connected to main control microprocessor 154 and floor displacement microprocessor 144 and all are physically located in cab 22 of vehicle 20 for convenience of the operator. Control console 180 is shown in detail in FIG. 13. All of the switches shown on FIG. 13 are electrically connected to main control microprocessor 154. Microprocessor 154 has access to bumper up and bumper down limit switches, pto limit switch, reverse (backup light) limit switch, auxiliary transmission limit switch, and low gear limit switch. Microprocessor 154 also has access to a number of membrane switches including bumper up and bumper down switches, 200 and 202, respectively; pto on and pto off switches, 204 and 206, respectively; automatic and manual switches, 208 and 210, respectively; load and unload switches, 212 and 214, respectively; front load light and rear load light switches, 216 and 218, respectively; override and load lights off switches, 220 and 222, respectively; and bed tilt down and bed tilt up switches, 224 and 226, respectively.

Figure 13:
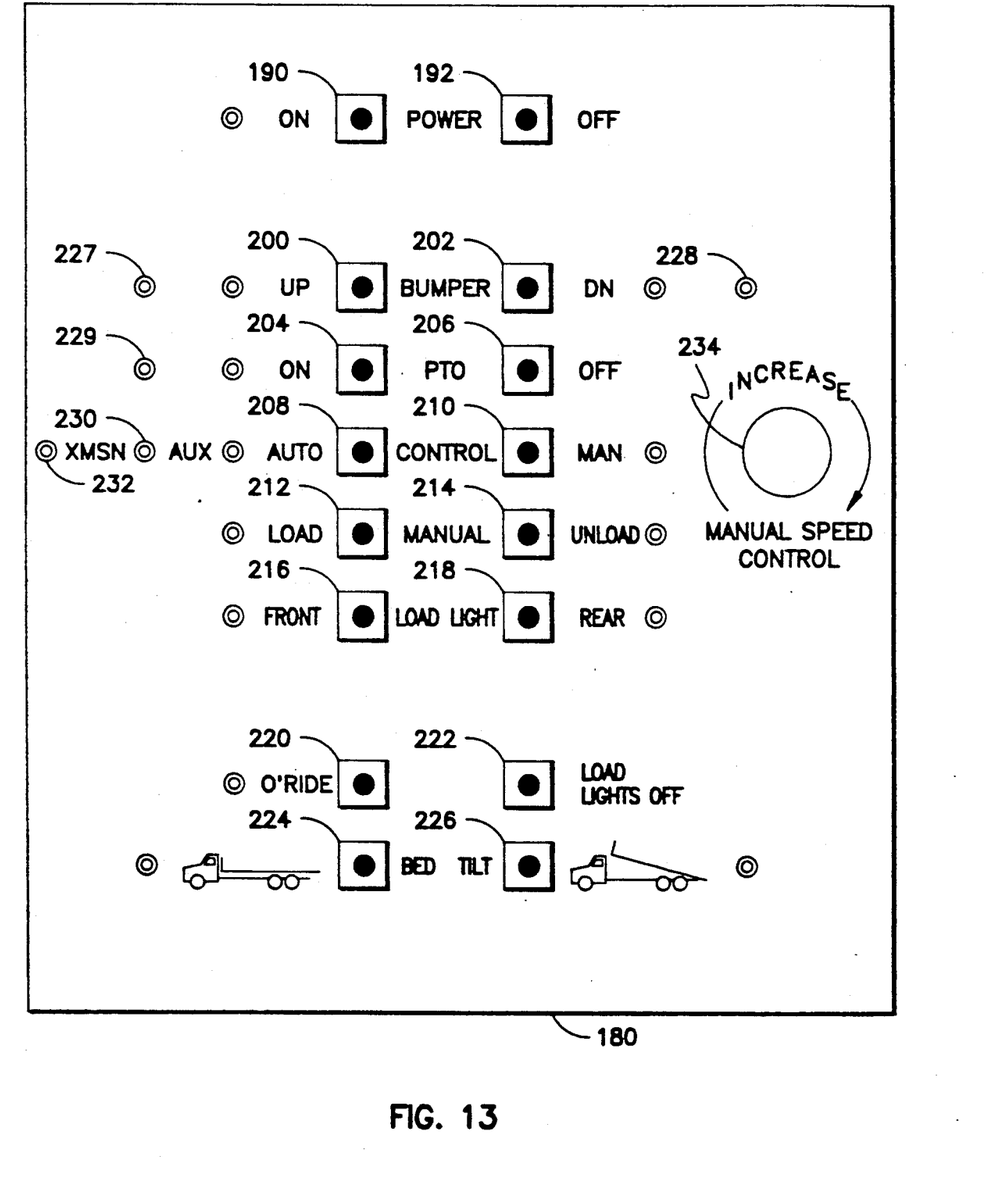
FIG. 13 is a front elevation view of control console 180 of the present invention.

As can be seen on FIG. 13, lights are provided to assist the operator in determining which limit and membrane switches are a set. The lights immediately adjacent to the membrane switches described above indicate which membrane switches are set. Lights 227 and 228 indicate when bumper up and bumper down limit switches are set and light 229 indicates when pto limit switch is set. On and off power switches, 190 and 192, respectively, are provided as shown in FIG. 13.

In operation, when on switch 190 is set, main control microprocessor 154 interrogates bumper up membrane switch 200. Microprocessor 154 will not allow any of the other functions of the synchronization control process to take place until bumper up limit switch is set. This ensures that the back bumper of vehicle 20 has been moved of the way of bed 40 so that loading or unloading can occur. Microprocessor 154 then interrogates pto on switch 204 and when switch 204 is set, microprocessor 154 activates the pto solenoid valve, indicated by light 229. Microprocessor 154 then interrogates the rest of the control switches on console 180. Microprocessor 154 allows the bed 40 of mover 10 be tilted up and down, switches 224 and 226, the bumper to move up or down, switches 200 and 202, the lights to be turned on or off, switches 216 and 218, pto to be turned on or off, switches 204 and 206, and the automatic or manual mode to be selected, switches 208 and 210.

If the automatic mode of operation is selected by the operator, switch 208, microprocessor 154 actuates the auxiliary transmission solenoid valve indicated by light 230 on control console 180, and then checks to see if the auxiliary transmission is engaged, the secondary transmission is in low gear, indicated by light 232 on control console 180, and if the main transmission is in low or reverse. If both the auxiliary and secondary transmissions are engaged, main control microprocessor activates displacement microprocessor 144 and the automatic synchronization system of the present invention is activated.

Main control microprocessor 154 determines whether the main transmission of vehicle 20 is in low or reverse so that microprocessor 154 can either set or clear relay set 152 and thus configure the hydraulic pump for loading or unloading. When the main transmission of vehicle 20 is in low, relay set 152 is not activated and hydraulic pump 158 drives hydraulic motors 160 and 161 and hence chain floor 50 to move in a direction from the cab 22 of vehicle towards the read end 46 of bed 40. In this manner, modules can be unloaded from mover 10. When the main transmission of vehicle 20 is in reverse, microprocessor 154 activates relay set 152 to reverse the direction of flow of the hydraulic pump and hence the direction of movement of chain floor 50. When the main transmission of vehicle 20 is in reverse, chain floor 50 moves in a direction from the rear end 46 of bed 40 towards cab 22 of vehicle 20. In this manner, modules are loaded onto mover 10.

During the entire operation, main control microprocessor 154 continues to interrogate manual switch 210 and load and unload switches 212 and 214, respectively. If manual switch 210 is selected by the operator, chain floor 50 can be moved manually in either direction by activating the load and unload switches, 212 and 214, respectively. The speed of chain floor 50 can be manually selected by use of the speed control center top potentiometer 234 shown in FIG. 13.

Several other control functions could be added to the present invention, such as automatic bed tilt, automatic bumper control, automatic shifting of pto, automatic shifting of auxiliary transmission, safety interlocks and a host of other convenience features for the operator.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An automatic loading/unloading material mover for moving material over a grade, which comprises:
   a. a motorized vehicle having at least one non-driven wheel, a non-rotating wheel housing, at least a driven wheel for displacing the vehicle and a bed having a conveyor floor;
   b. tilt control means connected to the bed for moving the bed to a position with the conveyor floor at an acute angle with respect to the grade;
   c. motive power means connected to the conveyor floor for displacing the conveyor floor relative to the vehicle in a direction parallel to a length of the vehicle;
   d. displacement synchronization means connected to the motive power means for synchronizing the displacement of the conveyor floor relative to the vehicle, and the displacement of the vehicle, the displacement synchronization means including:
      i. first sensor means connected to the non-driven wheel for providing an electric pulse corresponding to each unit of distance displaced by the vehicle;
      ii. second sensor means connected to the conveyor floor for providing an electric pulse corresponding to each unit of distance displaced by the conveyor floor relative to the vehicle;
      iii. digital processing means electrically connected to the first and second sensor means for receiving and processing pulses from the first and second sensor means and for generating an output signal proportional to the number of pulses received from the first and second sensor means; and
      iv. control means electrically connected to the digital processing means for receiving the output signal from the digital processing means and controlling the motive power means so that the displacement of the conveyor floor is proportional to the output signal in order to minimize jarring of the material.

2. The mover according to claim 1 wherein the first sensor means comprises a plurality of magnets attached to a ring which is attached to the non-driven wheel and at least one pulse-generating magnetic sensor attached to the non-rotating wheel housing in close proximity to the magnets and electrically connected to the digital processing means.

3. The mover according to claim 2 wherein the magnets are equally spaced around a circumference of the ring and the pulse-generating magnetic sensor is located on the wheel housing so that it is in close proximity to a path of the magnets when the non-driven wheel rotates.

4. The mover according to claim 2 wherein there are three pulse-generating magnetic sensors connected in series.

5. The mover according to claim 2 wherein the pulse-generating magnetic sensor generates an electric pulse when a magnetic pole is changed by the magnets moving a said predetermined distance which corresponds to the vehicle being displaced said unit of distance.

6. The mover according to claim 1 wherein the motive power means is a motor having an output shaft and wherein the mover further comprises gear box means for translating power from the output shaft to a conveyor drive shaft connected to the conveyor floor, the gear box means including a gear attached to the conveyor drive shaft.

7. The mover according to claim 6 wherein the second sensor means comprises a plurality of magnets attached to the gear and at least one pulse-generating magnetic sensor attached to the gear box means and electrically connected to the digital processing means.

8. The mover according to claim 7 wherein the magnets are equally spaced around a circumference of the gear and the pulse-generating magnetic sensor is located on the gear box means in close proximity to a path of the magnets when the gear rotates.

9. The mover according to claim 7 wherein there is one pulse-generating magnetic sensor.

10. The mover according to claim 6 wherein the pulse-generating magnetic sensor generates an electric pulse when the magnetic pole is changed by the magnets moving a predetermined distance which corresponds to the conveyor floor being displaced said unit of distance.

11. The mover according to claim 1 wherein the control means includes direction means connected to the digital processing means for controlling the direction of displacement of the conveyor floor.

12. The mover according to claim 11 wherein the direction means automatically controls the displacement of the conveyor floor so that the displacement is in the direction opposite that of the displacement of the vehicle when the vehicle moves.

13. The mover according to claim 1 wherein the digital processing means includes a pulse register and counting means for incrementing contents of the pulse register when the digital processing means receives an electronic pulse from the first sensor means and decrementing contents of the register when the digital processing means receives an electronic pulse from the second sensor means whereby the contents of the pulse register equals the difference between the number of pulses received from the first sensor means and the number of pulses received from the second sensor means.

14. The mover according to claim 13 wherein the output signal is a pulse width modulated output signal having a duty cycle which is proportional to the contents of the pulse register.

15. The mover according to claim 1 wherein the output signal of the digital processing means is directly proportional to the difference between the number of pulses received from the first and second sensors.

16. The mover according to claim 1 wherein the digital processing means includes a pulse register, counting means for incrementing contents of the pulse register when the digital processing means receives an electronic pulse from the first sensor means and decrementing contents of the register when the digital processing means receives an electronic pulse from the second sensor means, and adjustment means for periodically adding a pulse to those pulses received from the first or second sensor means.

17. The mover according to claim 1 wherein the control means includes limit means for controlling the motive power means to displace the conveyor floor at maximum speed when the output signal reaches a preselected value.

18. The mover according to claim 1 wherein the control means controls the displacement of the conveyor floor so that it is equal in distance to the displacement of the vehicle.

19. The mover according to claim 1 wherein the conveyor floor is a chain floor.

20. The mover according to claim 1 wherein the motive power means includes at least one hydraulic motor.

21. The mover according to claim 20 wherein the control means includes a variable flow hydraulic pump having volume controller means for controlling a volume of the hydraulic pump so that the volume is proportional to the output signal received from the digital processing means.

22. An automatic loading/unloading material mover for moving material over a grade, which comprises:
  a. a motorized vehicle having at least one non-driven wheel, a non-rotating wheel housing, at least a driven wheel for displacing the vehicle and a bed having a conveyor floor connected to a drive shaft;
  b. tilt control means connected to the bed for moving the bed to a position with the conveyor floor at an acute angle with respect to the grade;
  c. motive power means for displacing the conveyor floor in a direction parallel to and opposite the displacement of the vehicle;
  d. connection means for connecting the motive power means to the conveyor floor drive shaft, connection means including elements which rotate when the drive shaft rotates and elements that do not rotate when the drive shaft rotates;
  e. a first plurality of magnets connected to the non-driven wheel;
  f. a first pulse generating magnetic sensor connected to the non-rotating housing of the non-driven wheel so that it is in close proximity to a path of the first plurality of magnets when the n on-driven wheel rotates, the first sensor generating a pulse for each unit of distance displaced by the vehicle;
  g. a second plurality of magnets connected to one of the rotating elements of the connection means;
  h. a second pulse generating magnetic sensor connected to one of the non-rotating elements of the connection means in close proximity to the path of the second plurality of magnets when the conveyor floor drive shaft rotates, the second sensor generating a pulse for each unit of distance displaced by the conveyor floor;
  i. a microprocessor electrically connected to the first and second pulse generating magnetic sensors, the microprocessor including comparison means for calculating a difference between the number of pulses generated by the first sensor and the number of pulses generated by the second sensor and signal generating means for generating an output signal proportional to the calculated difference; and
  j. control means connected to the motive power means for controlling the motive power means so that the displacement of the conveyor floor is proportional to the output signal in order to minimize jarring of the material.

23. The mover according to claim 22 wherein the microprocessor further includes adjustment means for periodically adding a pulse to those pulses generated by the first or second sensor.

24. The mover according to claim 22 wherein the control means further includes limit means for controlling the motive power means to displace the conveyor floor at maximum speed when the output signal reaches a preselected value.

25. The mover according to claim 22 wherein the unit of distance displaced by the vehicle for which the first sensor generates a pulse is equal to the unit of distance displaced by the conveyor floor for which the second sensor generates a pulse, and wherein the output signal is directly proportional to the difference between the number of pulses generated by the first sensor and the number of pulses generated by the second sensor.

26. The mover according to claim 22 wherein the control means controls the displacement of the conveyor floor so that it is equal in distance to the displacement of the vehicle.

27. The mover according to claim 22 wherein the motive power means includes at least one hydraulic motor driven by a variable flow hydraulic pump and wherein the control means includes a pump volume controller for controlling a volume of the pump so that the volume is proportional to the output signal.

28. A method for automatically loading/unloading material onto a mover for moving material over a grade, the mover being of the type having a motorized vehicle supported by at least one non-driven wheel, at least a driven wheel for displacing the vehicle and having has a tiltable bed with a motorized conveyor floor, the method comprising the following steps:
 a. tilting the bed of the vehicle until the rear end of the bed is in close proximity to the grade;
 b. displacing the conveyor floor relative to the vehicle in a direction parallel to a length of the vehicle;
 c. providing from the non-driven wheel to a microprocessor an electric pulse corresponding to each unit of distance displaced by the vehicle;
 d. providing to the microprocessor an electric pulse corresponding to each unit of distance displaced by the conveyor floor relative to the vehicle;
 e. generating an output signal from the microprocessor that is proportional to the number of pulses that correspond to distance displaced by the vehicle and the number of pulses that correspond to distance displaced by the conveyor floor; and
 f. controlling the displacement of the conveyor floor so that the displacement is proportional to the output signal in order to minimize jarring of the material.

29. The method according to claim 28 wherein the method further comprises the step of controlling the direction of displacement of the conveyor floor.

30. The method according to claim 29 wherein the step of controlling the direction of displacement of the conveyor floor includes selecting the direction to be opposite to the direction of displacement of the vehicle.

31. The method according to claim 28 wherein the step of generating an output signal includes incrementing a register in the microprocessor when the microprocessor receives a pulse corresponding to the vehicle being displaced said unit of distance, decrementing the register when the microprocessor receives a pulse corresponding to the conveyor floor being displaced said unit of distance; and generating a pulse width modulated signal having a pulse width proportional to contents of the register.

32. The method according to claim 28 further comprising the step of adding a pulse periodically to the pulses corresponding to the vehicle being displaced said unit of distance or to the pulses corresponding to the conveyor floor being displaced said unit of distance.

33. The method according to claim 28 wherein the step of controlling the displacement of the conveyor floor includes the step of displacing the conveyor floor at maximum speed when the output signal reaches a preselected value.

34. The method according to claim 28 wherein the step of controlling the displacement of the a conveyor floor includes the step of displacing the conveyor floor a same distance that the vehicle has been displaced.

* * * * *